No. 817,379. PATENTED APR. 10, 1906.
G. L. LUNDIN.
SMOKING PIPE.
APPLICATION FILED APR. 21, 1905.

Witnesses:
Nathan C. Lombard.
Edna C. Cleveland.

Inventor:
Gustaf L. Lundin.
by Alban Andrén
Atty.

# UNITED STATES PATENT OFFICE.

GUSTAF L. LUNDIN, OF EAST BOSTON, MASSACHUSETTS, ASSIGNOR OF ONE-THIRD TO THEODORE VON ROSENVINGE AND ONE-THIRD TO EDWARD J. O'BRIEN, OF BOSTON, MASSACHUSETTS.

SMOKING-PIPE.

No. 817,379.  Specification of Letters Patent.  Patented April 10, 1906.

Application filed April 21, 1905. Serial No. 256,700.

*To all whom it may concern:*

Be it known that I, GUSTAF L. LUNDIN, a citizen of Sweden, and a resident of East Boston, in the county of Suffolk and State of Massachusetts, have invented certain new and useful Improvements in Smoking-Pipes, of which the following is a specification.

This invention relates to improvements in smoking-pipes; and it has for its object means by which the bowl of the pipe can readily be cleaned from time to time and the nicotin and other deleterious substances ejected by blowing through the stem, as will hereinafter be fully shown and described, reference being had to the accompanying drawings, wherein—

Figure 1:
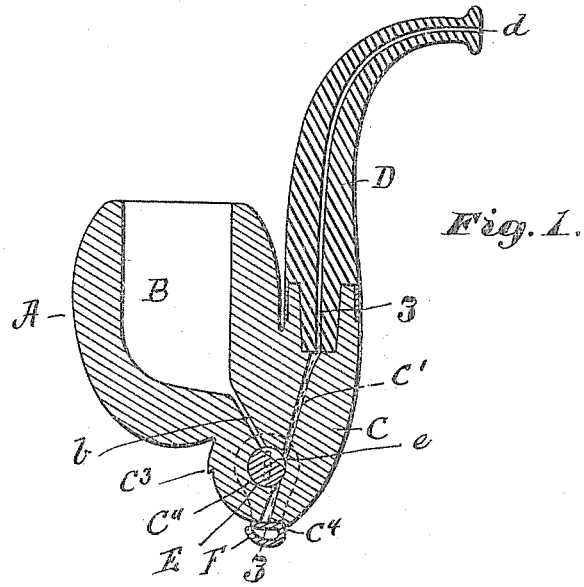
Figure 2:
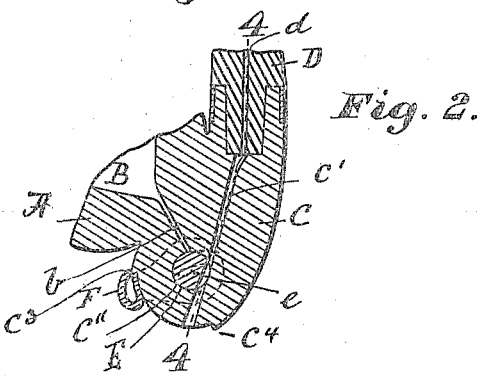
Figure 3:
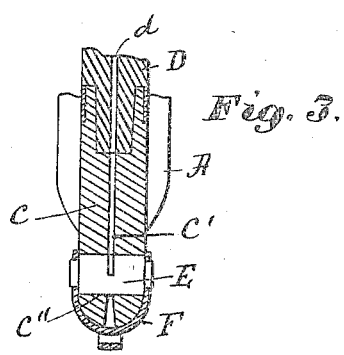
Figure 4:
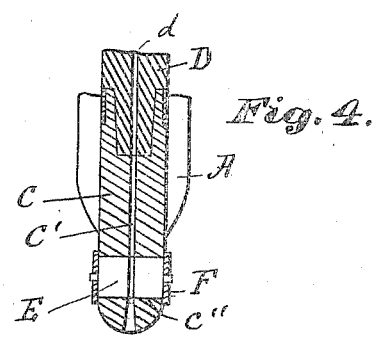

Figure 1 is a vertical section of the improved pipe, showing the valve-plug held in its normal position. Fig. 2 is a similar sectional view showing the valve-plug turned in position for cleaning the stem. Fig. 3 is a sectional view on the line 3 3 shown in Fig. 1, and Fig. 4 is a sectional view on the line 4 4 shown in Fig. 2.

Similar letters refer to similar parts wherever they occur on the different parts of the drawings.

In the drawings, A is the head of a tobacco-pipe, having a receptacle B for tobacco, as usual. Integral with the head A is a stem-holder C, as shown, to which the stem D is attached in any suitable manner. The said stem is preferably detachably secured to the stem-holder; but it may be made in one piece therewith, if so desired, without departing from the essence of my invention. The stem D is provided with a central perforation $d$, as usual. Through the stem-holder C is made a conduit C', extending through said stem-holder and passing through the bottom thereof, as shown. In said stem-holder near its lower end is a transverse perforation or valve-seat C'', in which is located a rotating cylindrical valve E, having on one side thereof a cut-away portion or groove $e$, as shown. $b$ is a channel or conduit leading from the bottom of the bowl B to the transverse perforation C'', in which the valve E is located. To the valve E is attached, preferably, a U-shaped handle F, which in addition to operating the valve also acts as a secondary closing means for the conduit C'.

$C^3$ and $C^4$ are stop projections on the stem-holder for limiting the adjustment of the handle F from the position shown in Fig. 1 to that shown in Fig. 2.

While the pipe is in use the valve E is held in the position shown in Fig. 1, causing the valve-recess $e$ to establish free communication between the bowl and stem, as shown. If it is desired to clean the stem, the valve E is moved from the position shown in Fig. 1 to that shown in Fig. 2, causing communication to be established from the stem through the now open valve through the bottom or discharge opening of the stem-holder, as shown, when the liquid contents of the stem and stem-holder can be expelled by blowing through the stem D.

The invention is very simple and by the construction as shown the accumulations in the stem and stem-holder can readily be forced out, so as to keep such parts clean from nicotin, &c.

What I wish to secure by Letters Patent and claim is—

1. A tobacco-pipe comprising a head forming a bowl and a stem-holder, said head provided with converging conduits, one extending from the end of the stem-holder through the head and ending in an outlet at the base thereof, the other extending from the base of the bowl and intersecting the first-mentioned conduit in the base of the head near the outlet, a valve seated at the point of intersection of the two conduits, and means exterior of the pipe for actuating the valves, said means acting as a secondary closing means for the valve.

2. A tobacco-pipe comprising a head, forming a bowl and stem-holder, said head provided with converging conduits, one extending from the end of the stem-holder through the head and ending in an outlet at the base thereof, the other extending from the base of the bowl and intersecting the first-mentioned conduit in the base of the head near the outlet, a valve seated at the point of intersection of the two conduits, means exterior of the pipe for actuating the valves, said means acting as a secondary closing medium for the valve, and stops on said holder for limiting the movement of said means.

In testimony whereof I have affixed my signature in presence of two witnesses.

GUSTAF L. LUNDIN.

Witnesses:
ALBÁN ANDRÉN,
LAURITZ N. MÖLLER.